US009594731B2

(12) United States Patent
Zarzar et al.

(10) Patent No.: US 9,594,731 B2
(45) Date of Patent: Mar. 14, 2017

(54) WYSIWYG, BROWSER-BASED XML EDITOR

(75) Inventors: Daniel G. Zarzar, Redmond, WA (US); Alberto Swett, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1177 days.

(21) Appl. No.: 11/824,601

(22) Filed: Jun. 29, 2007

(65) Prior Publication Data
US 2009/0006454 A1    Jan. 1, 2009

(51) Int. Cl.
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl.
CPC ............................... *G06F 17/2247* (2013.01)

(58) Field of Classification Search
CPC ................. G06F 17/2247; G06F 17/24; G06F 17/30905; G06F 17/30867
USPC .................... 715/234; 707/999.102, E17.122
See application file for complete search history.

(56) References Cited

U.S. PATENT DOCUMENTS

| 6,476,833 B1 * | 11/2002 | Moshfeghi | 715/854 |
| 6,535,896 B2 | 3/2003 | Britton et al. | 715/239 |
| 6,745,208 B2 | 6/2004 | Berg et al. | |
| 6,779,154 B1 | 8/2004 | Nussbaum et al. | 715/234 |
| 6,954,896 B1 | 10/2005 | Dodrill et al. | 715/234 |

(Continued)

FOREIGN PATENT DOCUMENTS

WO    WO2005/111844    11/2005    ............ G06F 17/00

OTHER PUBLICATIONS

"Bitflux Editor—The Wysiwyg XML"; accessed Apr. 30, 2007 at http://bitfluxeditor.org/; 1 pg.
Chlebikova, J., et al.; "Euromath System—the structured XML editor and browser"; Faculty of Mathematics and Physics, Comenius University, Bratislava; accessed Apr. 30, 2007 at http://ii.fmph.uniba.sk/~mnagy/documents/euromath-eurotex2001.pdf; 9 pgs.
Hu, et al.; "Prototype of a Web and XML Based Collaborative Authoring System"; Universitat der Bundeswehr, Neubiberg, Germany; accessed Apr. 30, 2007 at http://inform.bwi.unibw-muenchen.de/info/pub/000000099861.pdf; 6 pgs.

*Primary Examiner* — Manglesh M Patel
*Assistant Examiner* — Nicholas Hasty
(74) *Attorney, Agent, or Firm* — Michael David Ream; Tom Wong; Micky Minhas

(57) ABSTRACT

Computer-implemented methods and computer-readable storage media are disclosed for facilitating browser-based, what-you-see-is-what-you-get (WYSIWYG) editing of an extensible markup language (XML) file. A browser executing on a local computing system is used to access a hypertext markup language (HTML) representation of an extensible markup language (XML) file. The HTML representation includes a plurality of elements of the XML file formatted in accordance with an extensible stylesheet language (XSL) transform associated with the XML file. A plurality of editing handlers is inserted within the HTML representation to facilitate modifying the HTML representation and applying the changes to the XML file. A user is permitted to modify the HTML representation for purposes of applying the modifications to the XML file.

20 Claims, 12 Drawing Sheets

(56) References Cited

U.S. PATENT DOCUMENTS

| | | | |
|---|---|---|---|
| 7,200,816 B2 | 4/2007 | Falk et al. | 715/762 |
| 7,409,637 B2 * | 8/2008 | Benzinger | 715/256 |
| 7,409,673 B2 * | 8/2008 | Kuo et al. | 717/112 |
| 7,668,913 B1 * | 2/2010 | Underwood et al. | 715/236 |
| 2002/0023111 A1 * | 2/2002 | Arora | G06F 17/218 715/234 |
| 2002/0129106 A1 | 9/2002 | Gutfreund | 709/205 |
| 2002/0133516 A1 * | 9/2002 | Davis et al. | 707/513 |
| 2002/0152244 A1 * | 10/2002 | Dean et al. | 707/530 |
| 2003/0093756 A1 | 5/2003 | Behzadi et al. | 715/239 |
| 2003/0237046 A1 * | 12/2003 | Parker | G06F 17/24 715/234 |
| 2004/0088647 A1 | 5/2004 | Miller et al. | 715/234 |
| 2004/0123238 A1 * | 6/2004 | Hefetz et al. | 715/513 |
| 2004/0148508 A1 * | 7/2004 | Alev | G06F 21/64 713/180 |
| 2005/0102612 A1 * | 5/2005 | Allan et al. | 715/513 |
| 2005/0246627 A1 * | 11/2005 | Sayed | 715/513 |
| 2006/0031751 A1 * | 2/2006 | Ehud | 715/501.1 |
| 2006/0143562 A1 | 6/2006 | Seurig et al. | 715/234 |
| 2006/0294459 A1 * | 12/2006 | Davis et al. | 715/513 |

\* cited by examiner

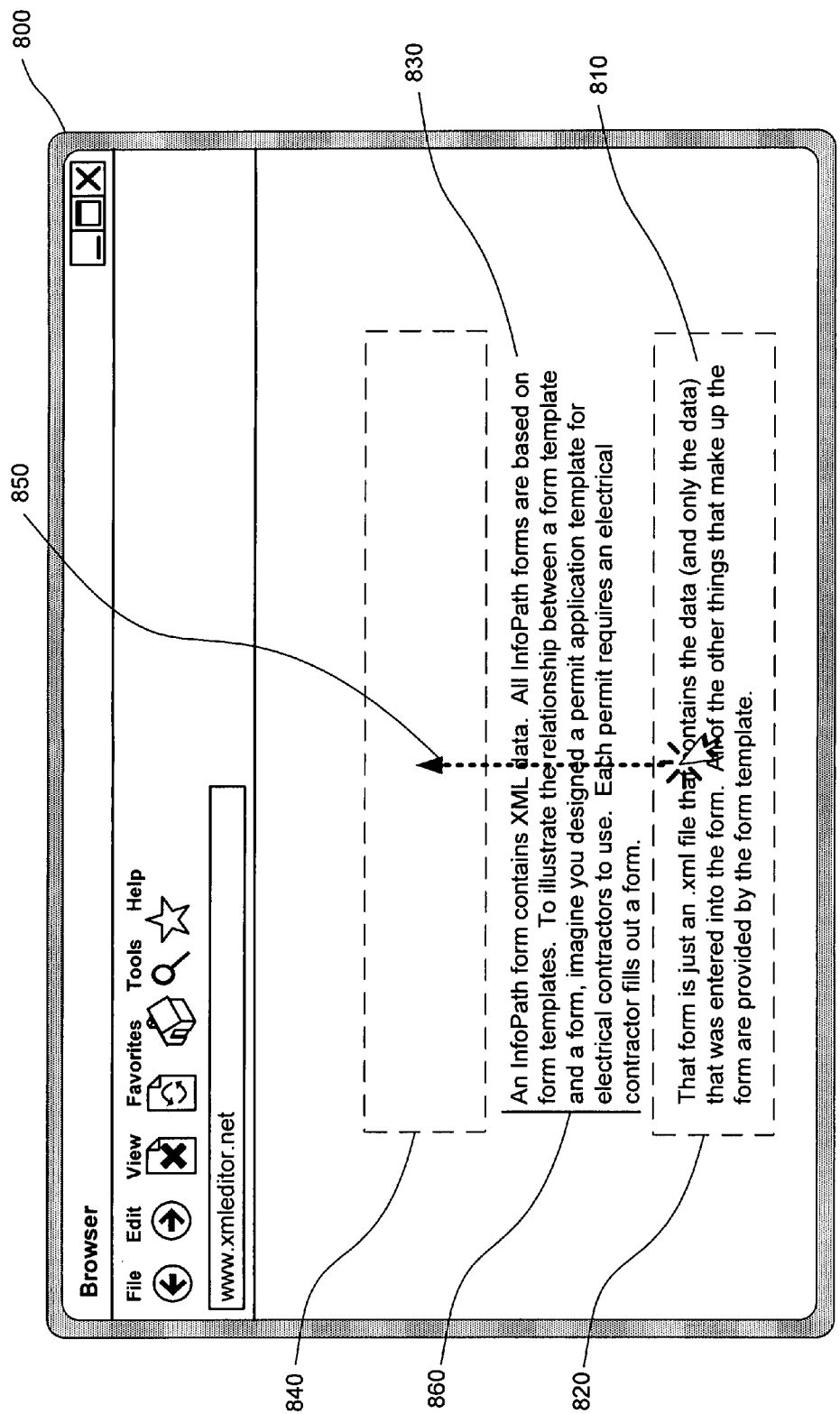

WYSIWYG, BROWSER-BASED XML EDITOR

BACKGROUND

Extensible markup language (XML) has become an increasingly popular language in which to create and store data. XML provides users with a great deal of flexibility because, as the designation "extensible" connotes, a user can define the user's own tags for applying attributes to data elements within an XML file or data stream. However, because XML is a descriptive markup language, not a presentational markup language, working with XML files to achieve a desired format can be difficult. Generally, to view XML data as it formatted, the XML is converted to a hypertext markup language (HTML) by applying an extensible stylesheet language (XSL) stylesheet transform. In other words, to create or edit XML data, and then to see the XML data as it is formatted, is a two-step approach.

To make working with XML files more convenient, it is desirable to use a what-you-see-is-what-you-get (WYSIWYG) editor. Some WYSIWYG editors are available as locally-executing client applications. In presenting the XML data as it will appear and in an editable format, these conventional editors employ a different XSL stylesheet for editing than will be used in production to transform the XML data to HTML. As a result, when the XML is used in production, such as to present a web page, there may be discrepancies between how the formatted XML data appeared in the editor and how it later appears online.

In addition, even though the client editor may generally show how the XML will appear when formatted, the XML still may inconvenient to use. Conventional editors may not support complex XSL transformations and users may only be able to format text on the paragraph level. In addition, when a user wishes to insert an XML element to create an object such as a table or a list, because XML generates such objects one element at a time, conventional client editors still may force the users to add each list element or each table cell one-at-a-time to correspond with the underlying XML. Consequently, even though the client XML editor may present the XML data in a mostly-WYSIWYG format, the user may have to have—or be forced to learn—some aspects of XML coding to proficiently create or edit XML files.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Computer-implemented methods and computer-readable storage media are disclosed for facilitating browser-based, what-you-see-is-what-you-get (WYSIWYG) editing of an extensible markup language (XML) file. A browser executing on a local computing system is used to access a hypertext markup language (HTML) representation of an extensible markup language (XML) file. The HTML representation includes a plurality of elements of the XML file formatted in accordance with an extensible stylesheet language (XSL) transform associated with the XML file. A plurality of editing handlers is inserted within the HTML representation to facilitate modifying the HTML representation and applying the changes to the XML file. A user is permitted to modify the HTML representation for purposes of applying the modifications to the XML file.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

In the drawings, like numerals represent like elements. In addition, the first digit in three-digit reference numerals and the first two-digits in four-digit reference numerals refer to the figure in which the referenced element first appears.

FIGS. 8A and 8B and 9A and 9B show screen views of drag and drop functions.

DETAILED DESCRIPTION OF IMPLEMENTATIONS

This detailed description describes implementations of a browser-based, what-you-see-is-what-you-get (WYSIWYG) XML editor. In the implementations presented in this description, the XML editor is a hosted application, allowing a user to edit XML files through a browser on an available networked client computer without having to access a special client application. The XML editor supports a number of desired features to make creating and revising XML files more intuitive than is possible with other XML editors.

Illustrative Operating Environment

Implementations of a browser-based, what-you-see-is-what-you-get (WYSIWYG) XML editor may be supported by a variety of computing devices. In some implementations, editing is performed on a client computing system in communication with a host computing system over a network as further described below.

Figure 1A:
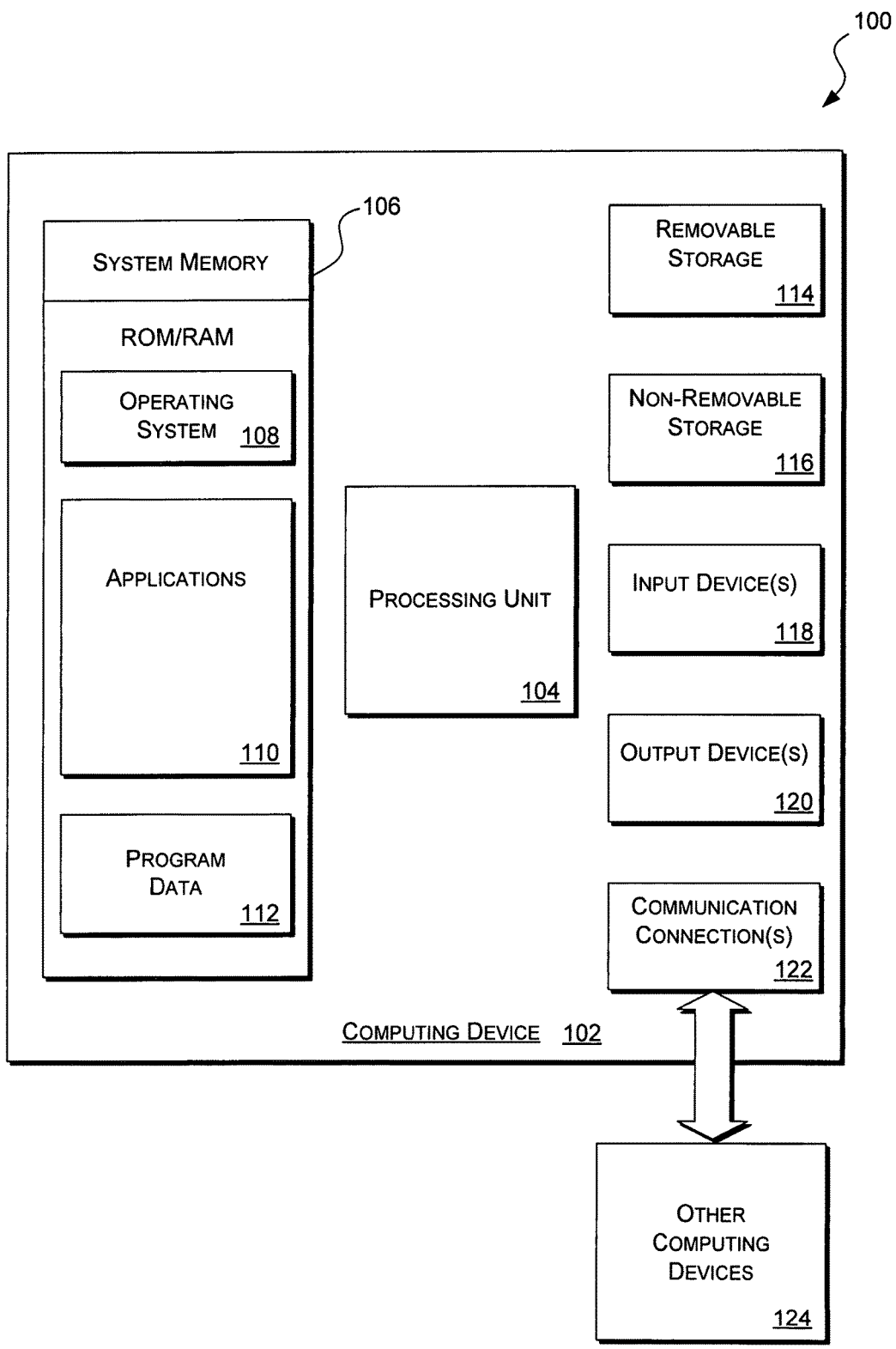
FIG. 1A is a block diagram of a local operating environment supporting implementations of computer-implemented methods and user interfaces as herein described.

FIG. 1A is a block diagram of a representative operating environment 100 operable to support computer-implemented methods and computer-readable media as herein described. The operating environment is representative of both a client computer system operable to run a locally-executing software program configured to present advertising content and a server that exchanges information with the client computer system.

Referring to FIG. 1A, an exemplary operating environment 100 includes a computing device 102. In a basic configuration, the computing device 102 may include any of a number of forms of stationary or mobile computing devices as described with reference to FIG. 1B. The computing device 102 typically includes at least one processing unit 104 and a system memory 106. Depending on the exact configuration and type of computing device, the system memory 106 may be volatile (such as RAM), non-volatile (such as ROM, flash memory, and the like) or some combination of the two. The system memory 106 typically maintains an operating system 108, one or more applications 110, and program data 112.

The computing device 102 may also have additional features or functionality. For example, the computing device 102 may also include additional data storage devices (removable and/or non-removable) such as, for example, magnetic disks, optical disks, or tape. Such additional storage is illustrated in FIG. 1A by removable storage 114 and non-removable storage 116. Computer storage media may include volatile and non-volatile, removable and non-removable media implemented in any method or technology for storage of information, such as computer readable instructions, data structures, program modules or other data. The system memory 106, the removable storage 114, and the non-removable storage 116 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 102. Any such computer storage media may be part of the computing device 102. The computing device 102 may also have input device(s) 118 such as a keyboard, mouse, pen, voice input device, touch input device, etc. Output device(s) 120 such as a display, speakers, printer, etc., may also be included.

The computing device 102 also may include one or more communication connections 122 that allow the computing device 102 to communicate with other computing devices 124, such as over a network or a wireless network. The one or more communication connections 122 are an example of communication media. Available forms of communication media typically carry computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Figure 1B:
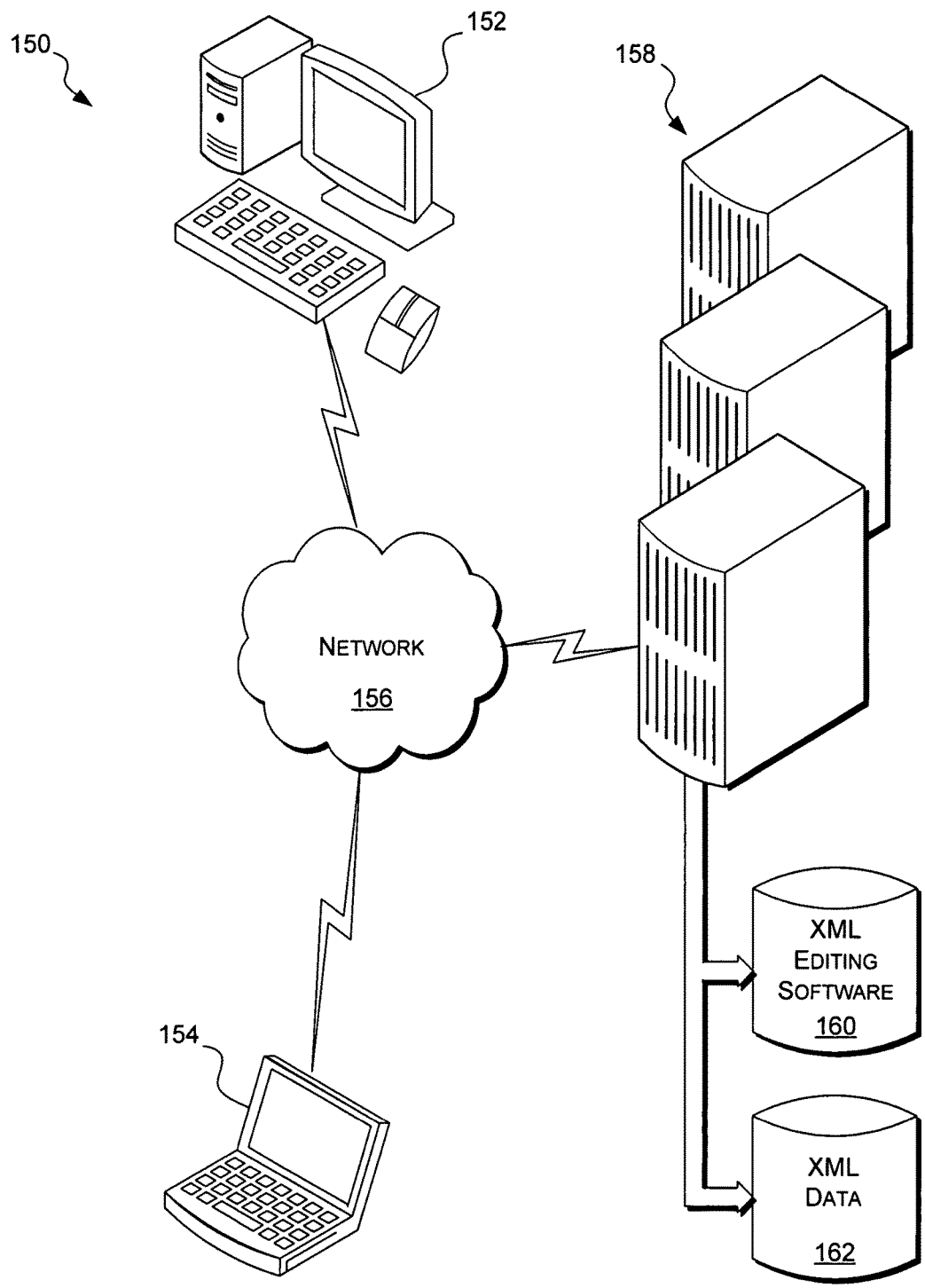
FIG. 1B is a block diagram of network environment supporting implementations of computer-implemented methods as herein described.

FIG. 1B illustrates a network environment 150 in which a plurality of client or user computing systems 152 and 154 of various types communicate over a network 146 with an server system 158. The client computing systems 152 and 154 communicate over the network 156 using wireless and/or non-wireless communications media. The network 156 may include the Internet, one or more intranets, and other networks.

The client computing systems 152 and 154 are able to communicate with the server system 158 over the network 146 to retrieve files for editing and/or to view files, such as web pages. The server system 158 may. The advertising server system 158 uses data stores 160 and 162. One of these may include XML editing software store 160 as further described below. Another of the data stores may include an XML data store 162. The XML editing software store 160 and the XML data store 162 both are used to facilitate editing XML data stored on the XML data store 162 on one or more client computing systems 152 and 154, as will be further described below.

Data Transformation in an Implementation of an XML Editor

Figure 2:
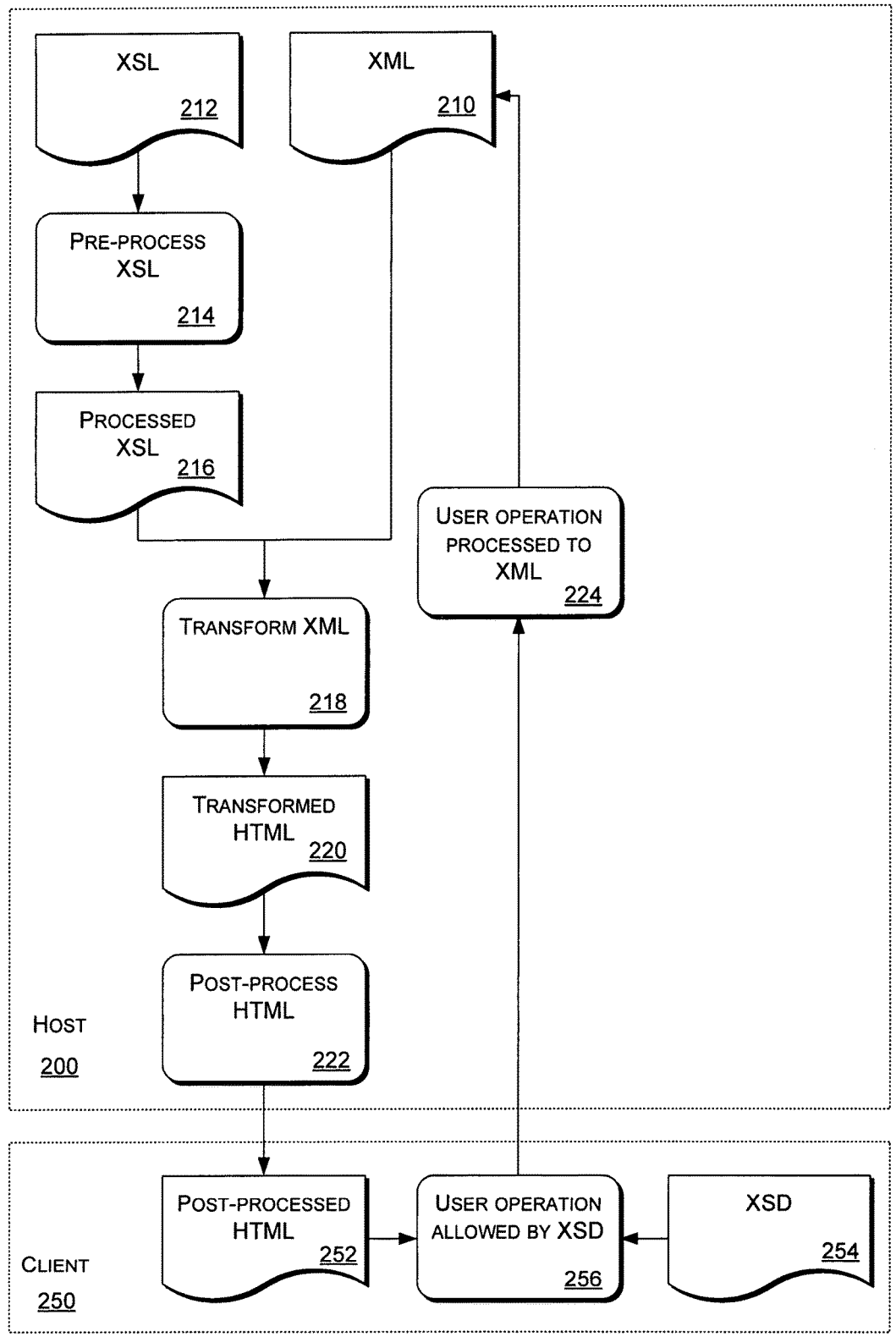
FIG. 2 is a data flow block diagram illustrating an implementation of the processing and flow of data within a hosted XML editor.

FIG. 2 is a block diagram illustrating the flow and processing of data in an implementation facilitating browser-based, WYSIWYG XML editing according to the present disclosure. In one implementation, XML editing is facilitated in a hosted environment in which data storage and processing takes place both on a host 200 and a client 250. An XML file 210 resides on a host system 200, along with an XSL stylesheet 212. As further described below, the XSL stylesheet 212 is submitted to an XSL pre-processor 214 resulting in processed XSL stylesheet 216. The processed XSL stylesheet 216 includes some of a plurality of editing handlers (not shown) that will be used to facilitate the XML editing process as further described below. The processed XSL stylesheet 216 is applied to the XML file 210 in an XSL transformer 218 to generate a transformed HTML file 220. The transformed HTML file 220 includes an HTML representation of the XML file 210 augmented with the editing handlers included in the processed XSL stylesheet 216.

The transformed HTML file 220 is submitted to an HTML post-processor 222. The HTML post-processor 222, as described further below, will introduce additional editing handlers to facilitate XML editing. The post-processed HTML file 252 is presented to the client 252 as an HTML representation of the XML file that will be edited by the client 250 as further described below. In one implementation, the client maintains XML schema data (XSD) 254 that specifies the parameters of the XML file 210. The XSD 254 is used to validate user operations 256 applied to the post-processed HTML file 252 to ensure that the user operations 256 do not violate the XML schema applied to the XML file 210.

As described further below, the user operations 256 are manifested on the client 250 for a user to view in an implementation of a WYSIWYG editor. At the same time, the user operations 256 are passed to the host 200 where a user operation processor 224 applies the user operation manifested on the client 250 to the XML file 210 on the host. In one implementation, the user operations are performed using a browser executing locally on the client 250. The browser may include one or more plugins, such as JavaScript produced by Sun Microsystems, Inc., to display the results of the user operations 256. When user operations 256 are performed on the client 250, a page displayed by the browser is not refreshed is not refreshed to correlate the changes made by the user operations 256 on the host 200 and on the client 250. Instead, asynchronous calls are made from the client 250 to the host 200 using web services to communicate the changes to the user operation processor 224.

The flow and processing of data illustrated in FIG. 2 will be described in greater detail in the following paragraphs.

Although not shown in FIG. 2, when the XML editor is initiated on the host 200, such as by a request originating on the client 250, a configuration file is executed to prepare the application for the types of documents to be supported during execution of the XML editor. An example configuration file is presented below:

```
<package name="topic">
<schema>packages\topic\HASchema.xsd</schema>
<transform>packages\topic\Transforms\awsenduser_012.xsl</transform>
<sourcetransform>SupportFiles\awsenduser_012.xsl</sourcetransform>
<xmlname>topic.xml</xmlname>
<htmlname>topic.htm</htmlname>
<modifiedhtmlname>topic-mod.htm</modifiedhtmlname>
<xslprocessor>
    <ignoredelementdivs>
        <ignoredelementdiv>/</ignoredelementdiv>
        <ignoredelementdiv>topic</ignoredelementdiv>
```

In one implementation, the configuration file is de-serialized into a class for easy access. In the configuration file, specific document support settings are defined as packages. Each of the packages defines several attributes about each XML file, including what schema and XSL transform are to be applied to each of the XML files and what filenames are to be used for the modified file during editing. In processing the configuration file, each package listed is evaluated, and all relevant settings are cached for subsequent processing.

The XSL pre-processor 214 is used to modify the XSL transform or transforms 212 to facilitate editing as described below. The modifications including adding code that can be identified later in the post-processed HTML 252 that is manipulated by the client 250. In one implementation, each xsl:template of the XSL transform or transforms 212 is evaluated and, as appropriate, codes are then added to pre-process the XSL transforms 212. In one implementation, the XSL pre-processor 214 is configured to be able to ignore indicated XSL transforms 210 as indicated in the configuration file executed upon initialization.

The codes added include custom identifiers (IDs) that are inserted in each template. In one implementation, the custom IDs are inserted in the templates as HTML comments. Because the custom IDs are manifested as HTML comments, they will not be displayed in the post-processed HTML 252. Nonetheless, the custom IDs provide markers that indicate where in the resulting HTML files each of the templates begins and ends. An example of such a comment is presented below:

<!--ECM-heading--><!--ECM-/heading-->

In one implementation of the present disclosure, in addition to custom IDs, XSL:IF statements are added to each of the XML elements to which an XSL template is applied. The XSL:IF statements will be rendered in later processing of resulting HTML if it is determined that an associated XML element is empty. Ordinarily, an empty XML element would not be rendered in HTML. However, for a user to be aware of and/or be able to edit that element using an implementation of the XML editor, the XML element should be displayed.

For example, the XML file 210 may include an un-ordered list that includes no list items. Ordinarily, the unordered list would not be rendered as HTML. However, because it is desirable that the user be able to see, and perhaps access, the un-ordered list, so as to add elements to the list, the previously empty list would without a list item the user will have nothing to see or click on, in this case however a bullet would appear saying "click here to edit list". A custom DIV element is introduced in the XSL:IF statement to cause the bullet to be displayed:

```
<xsl:if test="string-length(normalize-space(.)) = 0
    and count(child::node( )) = 0">
        <div>Click here to edit heading</div>
</xsl:if>
```

In one implementation of a browser-based editor, it is desirable to be able to validate the user operations 256 performed on the client 250 to ensure they do not conflict with the XML schema 254, as previously described. To facilitate this process, so as to know what new elements can be added by user operations 256 on the client 250, and/or what possible child elements one element can have, there must be an available reference to the XML schema for each document type. To facilitate this, each XML schema is de-serialized into classes. For example, each class includes optional schema elements, including complexTypes, simpleTypes, groups, choices, sequences, and attributes. These classes are added to a generic index for which the XML element name is used as a key. With this index available, at runtime, details regarding each XML element can be quickly accessed by name without having to parse an associated XML schema file.

Once the transforms have been pre-processed by the XSL pre-processor 216, for quick reference, the XSL transforms are cached. The templates may be used frequently, thus, caching the transforms will provide faster access to the templates. In one implementation, a Microsoft NET Framework 2.0 feature is used to compile XSL transforms via XslCompiledTransform. Each compiled transform is cached on the host 200 in a generic index. The keys to each of the cached transforms is the name of the package, as described above, with which each transform is associated.

Once the processed XSL 216 is generated, it is applied to the XML file 210 by the XML transformer 218 to generate the transformed HTML 220. As previously described, the transformed HTML will include custom ids (e.g., <!--ECM-heading-->). In addition, to facilitate implementations of a hosted XML editor, further code is added to the transformed HTML 220 by the HTML post-processor 222 to associate to each element of the HTML, by its custom ID, with the XML element it represents. In one implementation, the associations are formed by including the XPath query for each of the XML elements of the XML file 210 on the host 200 in the custom ID of each corresponding HTML element in the transformed HTML 220. For example, if the custom ID is "topic:1,article:1,heading:4" then the XPath query to the corresponding XML element is readily available to the XML editor. Specifically, the example custom ID indicates that topic is the rootElement, and only one rootElement exists. "Article" is a child element of topic. The "heading," with an index of "4" is the fourth heading child of article. Accordingly, it can be determined that the XPath Query is "topic[1]/article[1]/heading[4]," which in an XPath query will return a reference to the actual XML element.

In one implementation, for the custom IDs to effectively identify the XML elements with which each is associated, each time the document is transformed new custom IDs will be associated with each HTML element. Otherwise, as elements were added or deleted, the custom IDs would not include accurate XPath queries to the correct XML elements. Generating new custom IDs each time the HTML post-processor 222 generates the post-processed HTML 252 ensures that the custom IDs will represent the correct XPath queries.

Another aspect of the HTML post-processor 222 is the generation of HTML event handlers that are appropriate to each HTML element. For example, the HTML may include graphic elements that can be edited using a dialog box. In addition, according to implementations of the browser-based, WYSIWYG XML editor, some elements, such as bodies of text, can be edited using a Rich Text Editor. To facilitate accessing an appropriate editing tool, an event handler identifying the appropriate editing tool for each element is associated with each element. These "onclick" events thus, for example, may include "oncontextmenu" events to provide the editing capabilities and, thus, identify the appropriate editing tool, for an element that is selected with a pointer.

In addition to event handlers, possible implementations of an XML editor also specify custom HTML attributes to which the client 250 is configured to respond to facilitate editing operations. For example, as described further below, implementations of the XML editor may support drag and drop functionality for some elements. The configuration file can define which elements support drag and drop. During HTML processing by the HTML post-processor 222, elements for which drag and drop functionality is available are updated with a draggable attribute (e.g., draggable="true"). A JavaScript code will then enable these elements to support drag and drop functionality. This will be explained in greater detail below.

After being processed by the HTML post-processor 222, the transformed HTML 220 may include elements that include the following, exemplary editing handlers:

```
<!--ECM-heading-->
<h3     id="topic:1,article:1,heading:4"
        onclick="GetNodeInfo(this.id)"
        oncontextmenu="createContextMenu(this.id)"
        draggable="true">
    View the form files for a form template
</h3>
<!--ECM-/heading-->
```

Processes and Functions of a Brower-Based, WYSIWYG XML Editor

Figure 3:
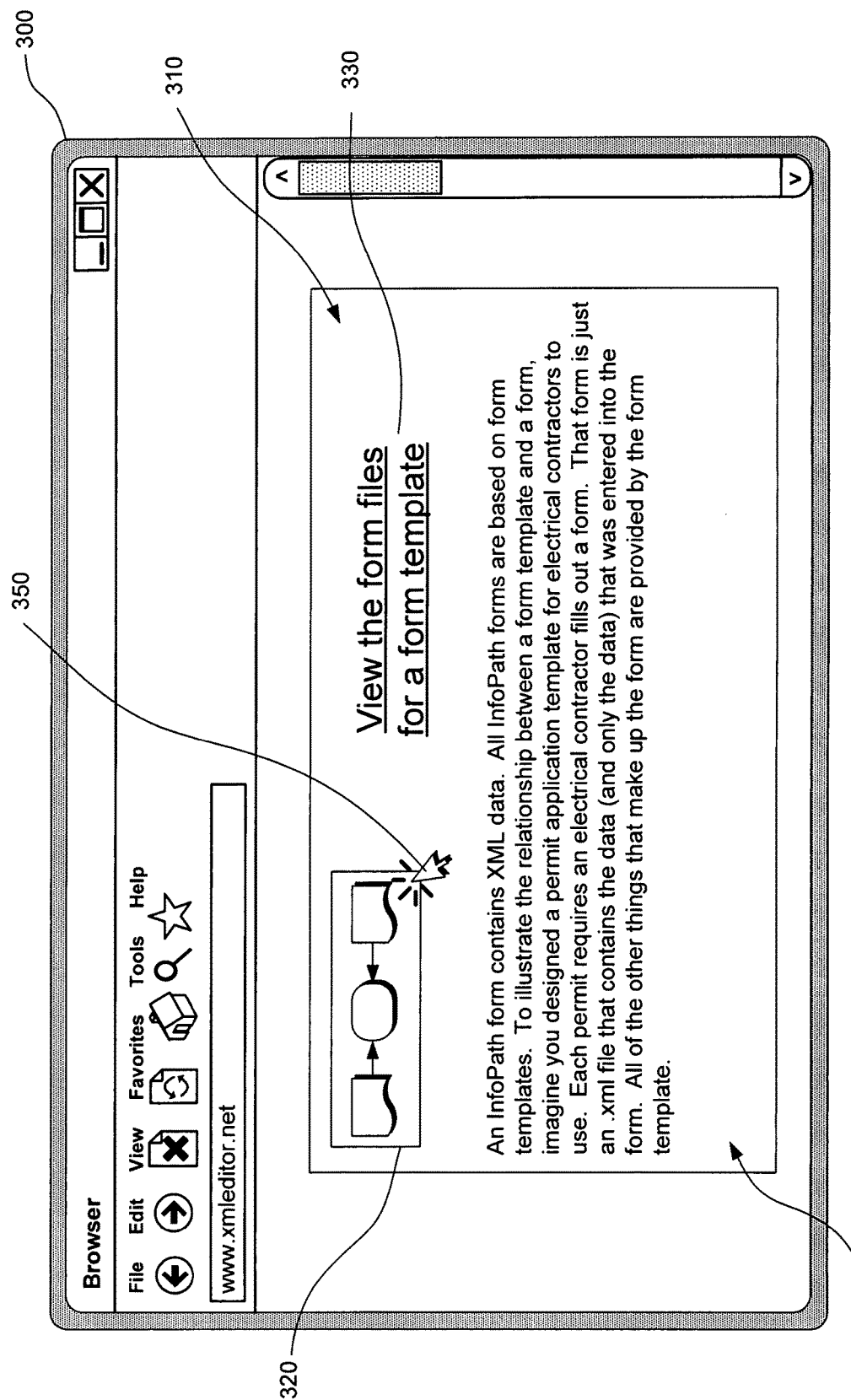
FIG. 3 is a screen view presented by a browser used to engage an implementation of a browser-based, WYSIWYG XML editor.

Once the post-processed HTML 252 is received by the client, it is edited using a browser. FIG. 3 is a browser screen 300 showing the user engaging a browser to engage an implementation of a browser-based, WYSIWYG XML editor. The screen shows an HTML representation 310 of an XML file, generated as described with reference to FIG. 2. The HTML representation 310 includes a graphic object 320, a title 330, and a body of test 340. The HTML representation 310 appears as an HTML file would appear in a browser screen 300; that is one of the advantages of possible implementations of the present disclosure, allowing the user see changes as they will appear. To edit the HTML representation 310, for example, the user manipulates a pointer 350 to select an element of the HTML representation 310, such as the graphic object 320. As was suggested previously and is described below, depending on the event handler assigned by the HTML post-processor 222, each of the HTML elements may be edited using a dialog-based editor or a rich-text editor.

Dialog-Based Editing

Figure 4A:
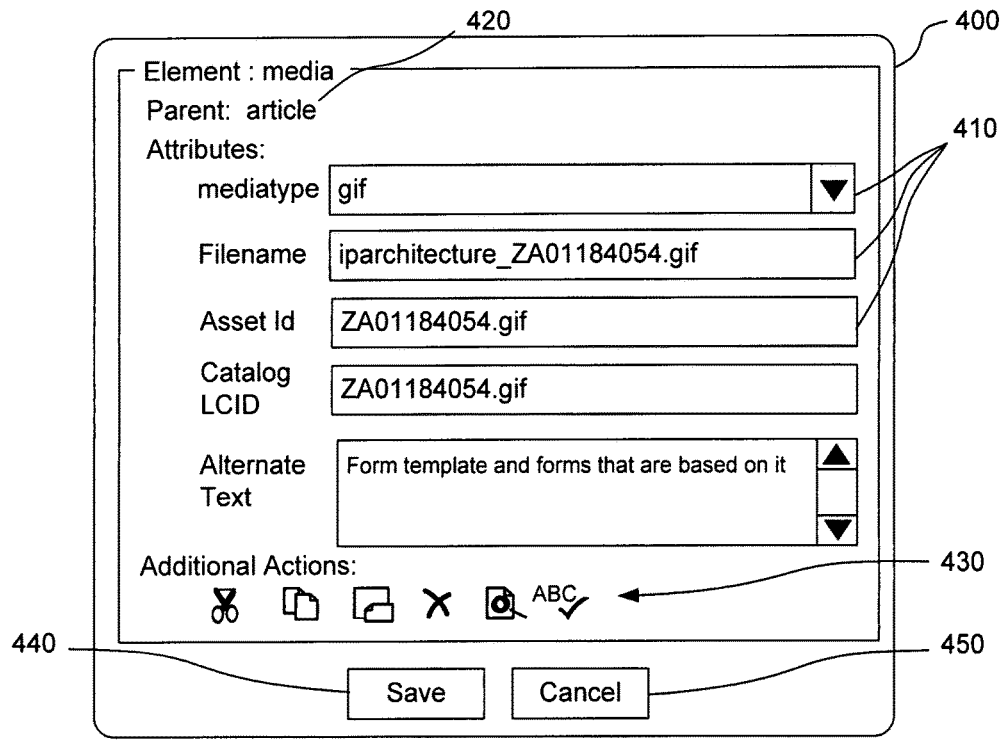
FIGS. 4A and 4B are dialog boxes generated for editing selected objects presented in the XML editor.

FIG. 4A shows a dialog box 400 allowing a user to make changes to an XML object such as graphic object 320 (FIG. 3). When a user clicks on an element such as the graphic object 320, the application makes an Asynchronous JavaScript and XML (AJAX) call passing the custom ID of the element, which includes the XPath Query of the corresponding XML element as previously described. The host then evaluates the XML element and its attributes, such as the nature of the XML element and/or additional metadata, such as hierarchical information regarding, for example, what children the XML element supports according the XML schema. This information is then serialized into JSON and returned to the browser executing on the client using an asynchronous call. Once this information is returned to the browser, ASP.NET AJAX controls and DHTML can be used to dynamically generate a modal dialog with fields that represent the attributes of the selected XML element.

Each of these dialogs will vary depending on the attributes of each element as defined in the schema. Using JavaScript as a runtime facility, it can dynamically modify the user interface to present the fields associated with these attributes. For example, if an element attribute is an enumeration type that can take many values as defined by the schema, JavaScript will generate the user interface to include a field with a dropdown box listing the options for the field that a user may select.

FIG. 4A shows a dialog box 400 generated over the browser screen (not shown in FIG. 4A) to make modifications to the graphic object 320 selected in FIG. 3. The dialog box 400 includes a plurality of fields 410 appropriate to the graphic object 320, including the mediatype, the filename of the element, and other descriptive information.

The modal dialog also provides additional functionality for users. At the top left of the dialog there is a reference 420 to the parent element of the element being edited. If a user clicks on the reference 420 to the parent element name, in one implementation, the modal dialog is automatically refreshed to contain data for the parent element. Accordingly, the user can traverse and navigate the XML hierarchy using the dialog box 400.

The dialog box 400 also provides additional actions menu 430 that provides access to functions such as cutting, copying, pasting, etc. that can be performed on the element by selecting a desired action from the graphical user interface. In one implementation, the options available from the additional actions menu 430 are context-dependent. For example, a spell-check option or a preview option may be available only for text-based objects, but not graphical objects.

If the user makes changes and wishes to retain the changes, the user can select a Save button 440, or can discard any changes by selecting a Cancel button 450. Choosing to save the changes will reflect the changes on the browser screen 300 (FIG. 3), as well as manifest the changes in the corresponding XML element in the XML file 210 on the host 200, as described further below.

It is noted that a very similar interaction exists in dialog based editing when adding new elements. The difference would be that all the attributes are empty.

Figure 4B:
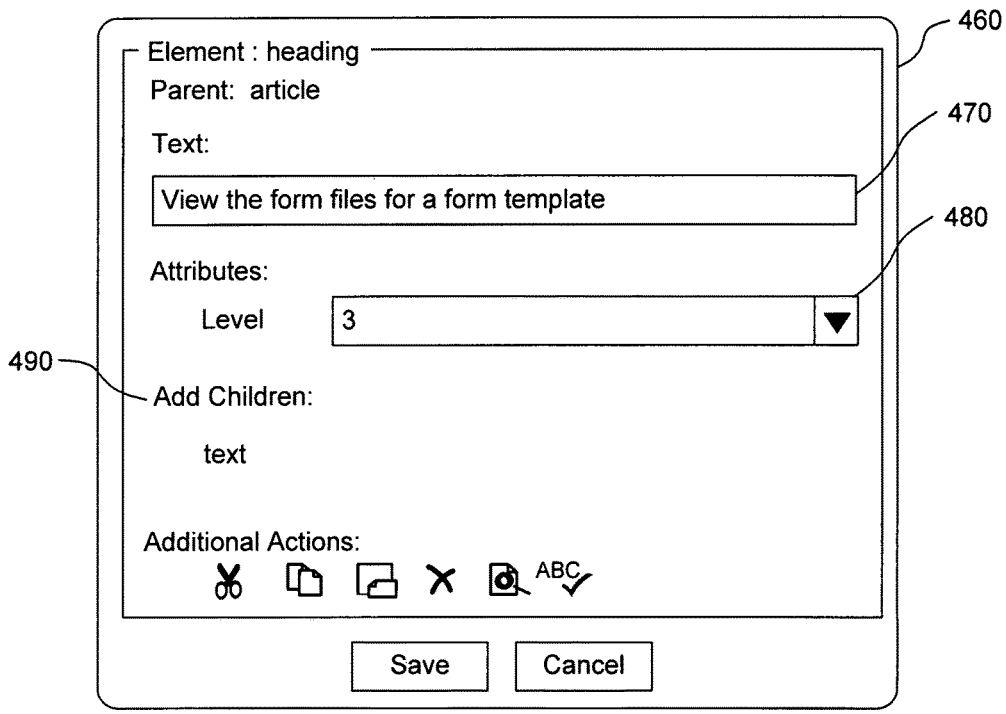

As previously mentioned, the dialog generated is tailored to the object selected for editing. For example, FIG. 4B shows a dialog box 460 generated when the title 330 (FIG. 3) is selected for editing. The dialog box 460 presents different options because the title object 330 is subject to different XML schema parameters and, thus, can be edited differently. The dialog box 460 includes an editing field 470 through which the user can change the content of the title object 330. Also, an attribute field 480, in apparent response to a hierarchy specified in the schema, includes a drop down option for setting the level of the title object 330. In addition, the dialog box 460 includes an Add Children link 590 to select possible children that may be inserted into the selected element, such as "text" as indicated in FIG. 4B. Clicking on the link 490 will add the element as a child of the selected element. Whether children can be added is, as usual, dictated by the XML schema for the selected object.

Once changes have been made and saved, the changes can be implemented on the XML file 210 (FIG. 2) on the host 200 using a JSON object that represents the XML elements. Modifications to the element in the dialog box 400 are applied to the JSON object, and then a serialized version of the JSON object is sent back to the host 200 via a web service call. Once the call is received by the host 200, the JSON object is automatically de-serialized back into a JSON object, and modifications applied to the selected object are applied to the corresponding XML element within the XML file 210 on the host 200.

Rich-Text-Based Editing

In addition to dialog-based editing, implementations of a browser-based, WYSIWYG XML editor also provide for rich text editing of text elements, provided that the configuration file causes an event handler allowing for rich-text editing to be applied to those elements. When a user clicks on an element that the configuration file identifies as rich-text editable element, instead of presenting a dialog box, a different user interface is presented, as shown in FIG. 5.

Figure 5:
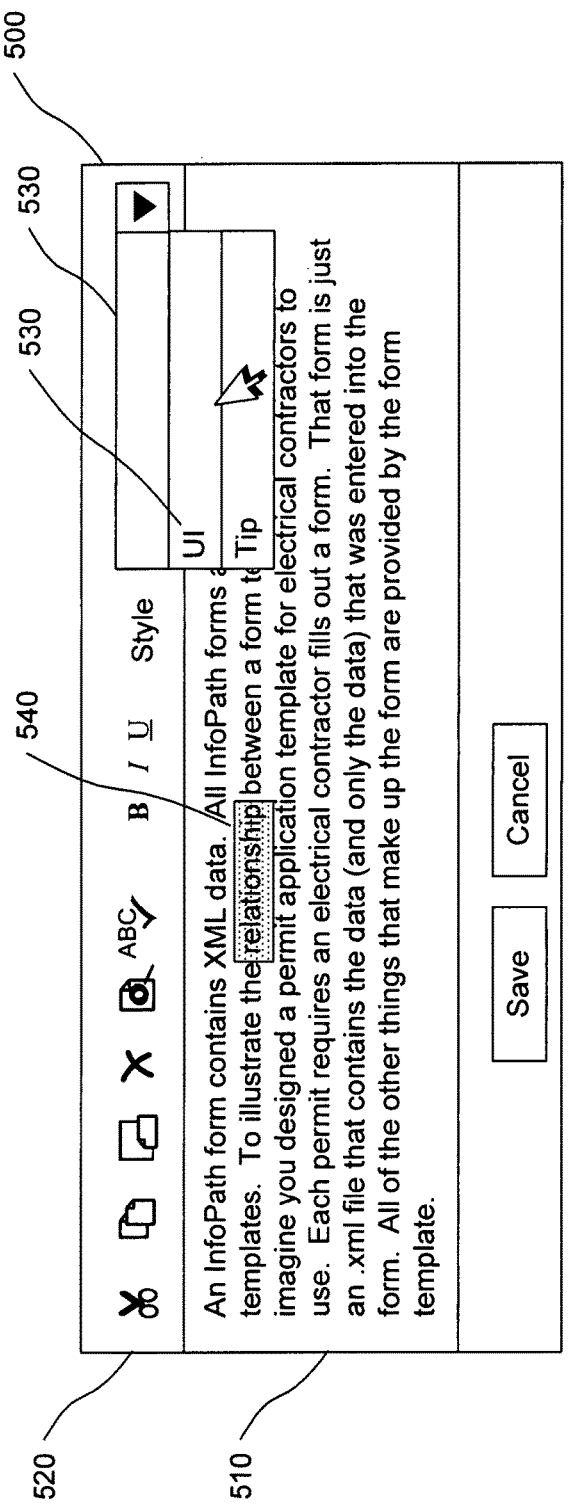
FIG. 5 is a rich text editing interface generated for editing a selected object that is indicated as permitting rich text editing.

FIG. 5 shows a rich-text editor interface 500 that would be presented in the browser window 300 (FIG. 3) when a rich-text editable element is selected. In one implementation of the present disclosure, the rich-text editor interface 500 is dynamically substituted where the element text is located, providing a seamless experience simulating a WYSIWYG environment. The rich-text editor interface 500 has many of the attributes of a word processor. For example, the rich-text editor interface 500 includes an editing pane 510 allowing the user to insert, delete, and modify text. The rich-text editor interface 500 presents a toolbar 520 that presents icons additional icons and one or more drop-downs 530 allowing the user to modify the text in the editing pane 510. The drop-down 530 may prove particularly convenient for users. When the predefined formats are defined by the schema, for example, the available formats can be presented in a drop-down menu to make it easy for a user to apply an allowed format to the text in editing pane 510.

Elements that have been defined as rich-text editable may contain independently-editable inline elements. These elements are ignored by the application in that users cannot interact with them directly. These inline elements can only be edited in rich-text mode. Because inline elements are originally presented in XML, the XML elements are converted to a form that the rich-text editor can accommodate. In one implementation, each rich-text editable element must contain its own forward-transform that will convert the XML to extensible hypertext markup language (XHTML) which the rich-text editor can process. For example: <ui> this is bold</ui> can be converted to <span class="ui">this is bold</span>. The span class tag allows the rich-text editor to work with portions of the text in the editing pane 510 of the rich text editor interface 500 separate elements within a larger XML element.

The configuration file is used to identify each element that is rich-text editable. There are two principal attributes that should to be updated. The first is a set of editor attributes that defines the element, describes the forward and backwards transforms, specifies what styles to configure for use in the rich-text editor, and what buttons to display in the rich-text editor interface 500. The second set of attributes is a plug-ins section that defines what plug-ins should be configured for use with the rich-text editor. Each plug-in can provide different functionality such, as opening up a modal dialog to search assets or edit custom HTML attributes.

A plug-in to generate custom links and Microsoft Office-specific XML elements, DefTerms may be used. The plug-ins are enabled or disabled for each element by listing them in a list of buttons to display in a buttonlayout element:

```
</xslprocessor>
<editors>
  <rte rootelement="text section">
    <forwardXSL>packages\topic\rte\textsection\forward.xslt</forwardXSL>
    <backwardXSL>packages\topic\rte\textsection\backward.xslt</backwardXSL>
    <styles>
      <style element="ui" htmlelement="span" styleclass="cdUiClass">UI</style>
      <style element="tip" htmlelement="p" styleclass="tip">Tip</style>
    </styles>
    <buttonlayout>
    [
      ['Cut', 'Copy', 'Paste', 'PasteText', 'PasteWord'],
      ['Undo', 'Redo', '=', 'Find', 'Replace', '=', 'SourceSimple'],
      '/',
      ['Style'],
      ['AWSLink', 'AWSDefTerm', 'Unlink'],
      ['OrderedList', 'UnorderedList']
    ];
    </buttonlayout>
  </rte>
</editors>
<rteplugins>
  <plug-in name="AWSLink">plugins/</plug-in>
  <plug-in name="AWSDefTerm">plugins/</plug-in>
</rteplugins>
</package>
```

Once the text can be accommodated by the rich-text editor, the rich text-editor interface 500 is formatted to include, for example, the drop downs 530 and other content-responsive features of the rich-text editor interface 500 are configured from the configuration file. Each button or option selected generates HTML elements, such an order or unordered list, and each style also generates elements with custom cascading style sheet classes. For example highlighting one or more words, such as the word "relationship" 540, and selecting "UI" 550 from the drop-down 530 will convert the text by applying a tag to the word 540 to associate at least one new editing handler for the span class, for example, <span class="ui">this is bold</span>. The fact that it is a span tag and what cascading style sheet class will used is also defined in the configuration file.

In one implementation of the rich-text editor, full undo and redo capabilities are provided to allow users to undo and/or cancel any changes they have made, as described further below. In one implementation, the rich-text editor maintains a pseudo-hash table in JavaScript that maintains an array of objects, each of which stores a copy of the original elements of the text before they were edited using the rich-text editor. In case the user wishes to undo a change or revert back to the original state of the element before saving the changes made, the previous state of portions of the text can be retrieved from the array and reinserted in the text.

Once text has been edited using a rich-text editor, content applied to the text, such as custom HTML elements or other rich-text editing imposed content, eventually, the text will have to be converted back into XML to update the document. To do this each rich-text editable element must also have a reverse transform that will convert the XHTML back into XML. For example, the tag <span class="ui">> which is what users see in the rich-text editing interface 500 is converted back into <ui>this is bold</ui>.

Context Menus

Figure 6:
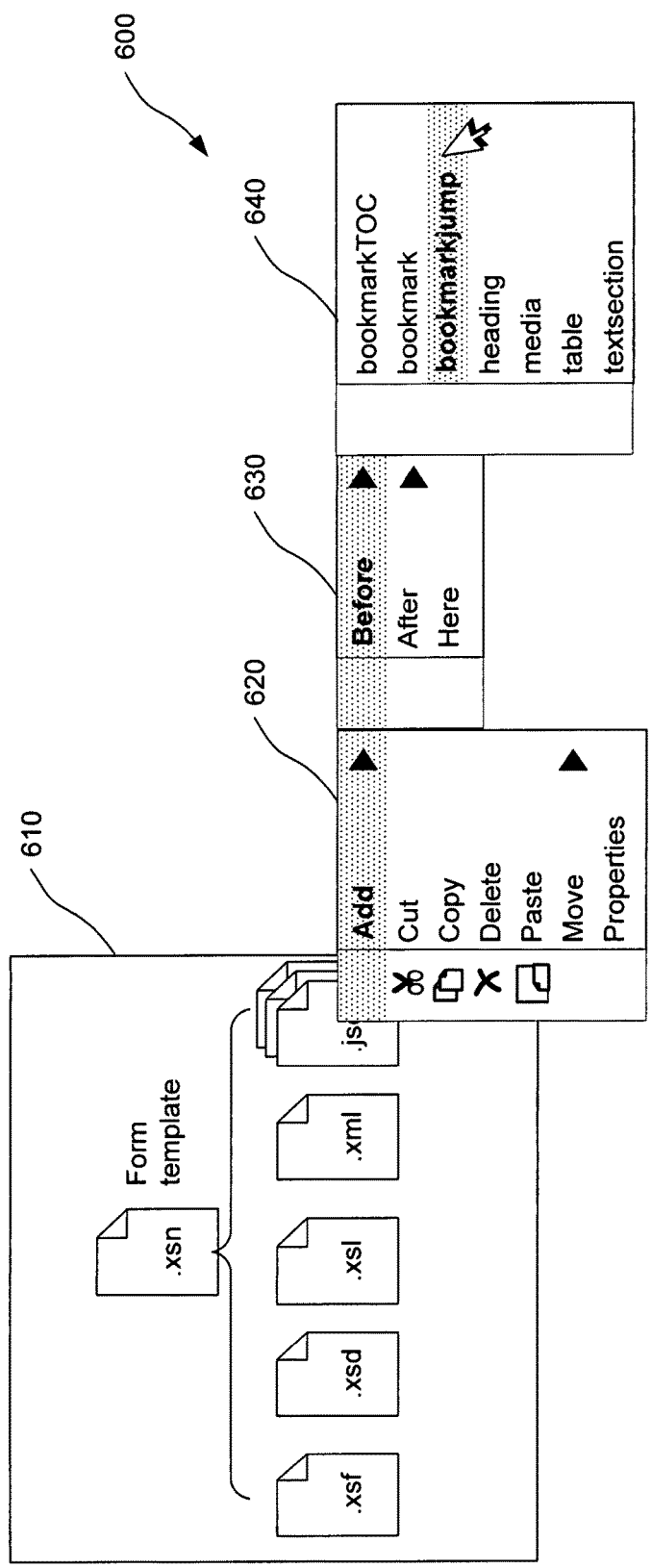
FIG. 6 is a context menu presented to display a relationship of a selected element to other related elements.

In one implementation, context menus 600 are provided for elements represented in the HTML representation as shown in FIG. 6. In one implementation, a user may select an object, such as image 610, by selecting the object with a pointer and clicking a right-mouse button. The resulting menu or menus 600 are generated for the selected object when the object is selected. In the example of FIG. 6, when the image 610 was selected, the XML editor accessed a parent element of the image 610 and determined what children could be added before and/or after the image.

The menus 600 include an option menu 620, indicating whether a user can add or otherwise change the children for the image 610. If a user selects an available option from the option submenu 620 that allows for a child to be added or repositioned, a sequence submenu 630 is generated to inform the user what options the user has. These options include, for example, whether an object can be moved or added before or after the current position. Finally, if a user chooses to add an element, an element submenu 640 is presented that lists what elements are defined in the XML schema that a user may introduce. The elements listed are comparable to a list of elements that would be presented in a dialog box as described with reference to FIGS. 4A-4B when using dialog-based editing. In addition to being able to add or move elements, elements can also be cut, copied, deleted, or pasted to the extend permitted by the XML schema. A user also can use the options submenu 320 to access the properties for selected object.

Revision Tracking

Revision tracking is a valuable feature, for example, when multiple persons, such as authors, editors, reviewers, and others, write and/or change the content of an XML file. Revision tracking allows a user to see what changes he or she has made to the file or to see what changes one or more other users have made to the file.

In an implementation of a browser-based, WYSIWYG XML editor operating in a hosted environment, a cookie is set in the browser to indicate whether the user has enabled the revision tracking feature. The cookie can be detected at the client and the host. When revision tracking is enabled, computer-implemented XML editing features will be processed by following a different code path.

When an element is added, the element is inserted in the HTML representation and the XML file as previously described. In addition, when the revision tracking feature is enabled, a custom XML attribute is appended, such as a rev="add". By comparison, when an element is deleted, the element is not actually deleted, but is marked with another XML attribute, such as rev="del". In an implementation of the WYSIWYG XML editor, the editing marks manifested in the XML attributes also result in an HTML attribute, such as an HTML comment that will be transformed into a visual indication. Depending on whether elements are added or deleted, different cascading style sheet classes are associated with the elements to visually denote whether the element has been added or deleted.

Figure 7:
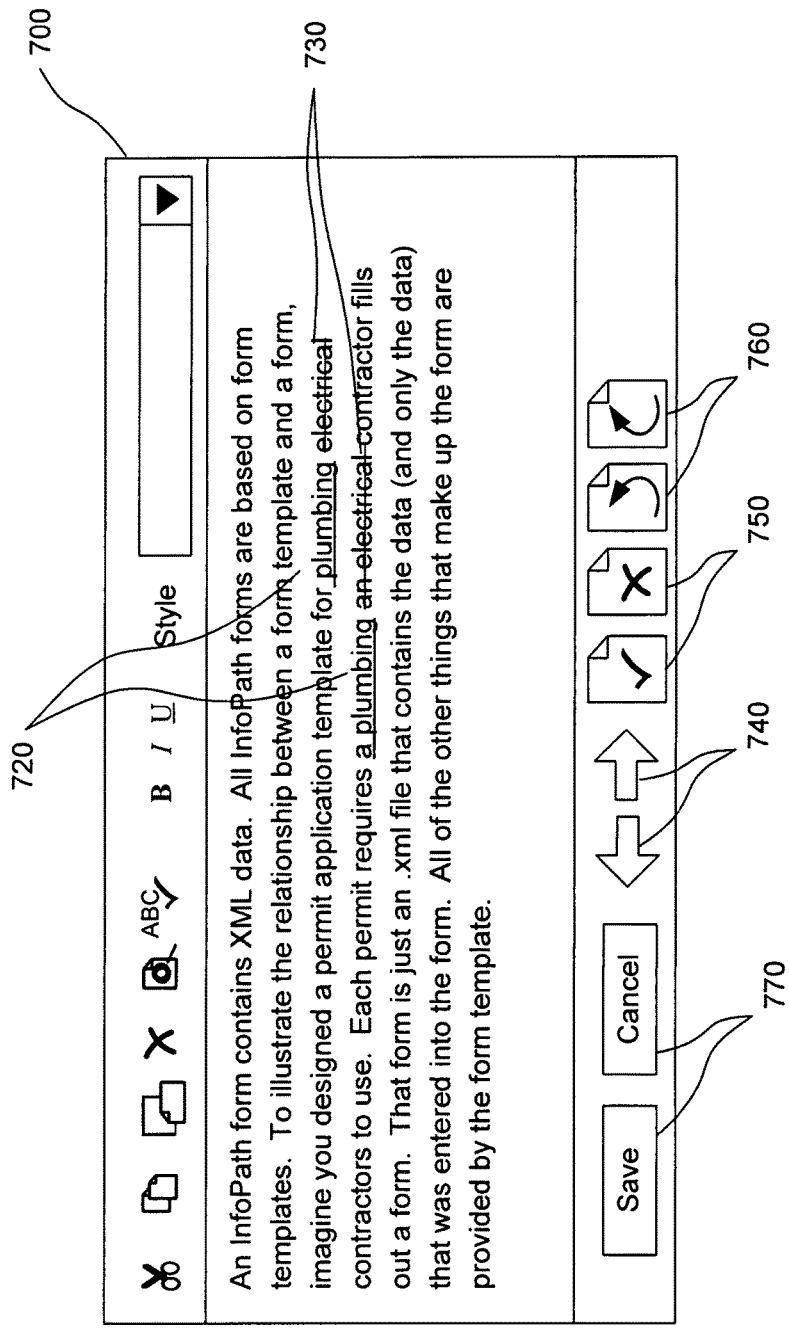
FIG. 7 is a screen view of a track changes option showing the addition and deletion of text from a text-based element.

FIG. 7 shows a rich-text editing interface 700 in which text has been added and deleted. In one implementation, in which insertions or additions 720 appear as underlined. Another representation or an associated color also may be applied to show additions and insertions. Deletions 730 are represented with strikethroughs, but also could be indicated by other visual cues, including colors or other symbols.

Once revisions have been made, revision tracking features are enabled to allow a user to review, accept, and/or reject changes. Reviewing buttons 740 allow a user to move forward or backward to the next closest revision. Accept and reject buttons 750 allow a user to one of accept or reject changes, respectively. When a change is accepted, the XML and HTML markers are removed, and the text element is modified to include the change. On the other hand, when a change is rejected, the changed text is deleted along with the XML and HTML markers. In one implementation, all paging and accepting or rejecting of changes are performed using JavaScript and DHTML and calls are made to the server using AJAX.

In addition to the revision tracking buttons 740 and 750, using the markers and tracking features used for revision tracking, undo and redo functions, represented by undo and redo buttons 760, could be included in the rich-text editing interface 700. Finally, save and cancel buttons 770 provide an overall control as to whether all or none of the changes entered in the rich-text editing interface 700 are applied or dismissed.

Implementations of a browser-based, WYSIWYG XML editor provide for inline revisions within a paragraph, rather than an ability to treat the paragraph as a whole. In one implementation, a differencing or diffing engine comparing the original node with the edited node could be used to present the changes. Special inline XML and HTML attributes are used to mark the XML elements to be changed and cause the changes to be visually represented, respectively. Implementations also allow for the insertion of user comments about existing text or about revisions being made. Comments could be inserted in the HTML representation and visually presented by inserting HTML comments recognized by the HTML processor as objects that should be presented. The presence of comments could be marked by a symbol that a user could select to read the comment in a pane, pop-up window, or other interface.

Drag and Drop

Implementations of a browser-based WYSIWYG XML editor include at least three types of drag and drop functions: drag and move, drag and replace, and drag and insert. In either case, the configuration file indicates which of the elements can be dragged. For example:

```
<elementsfordraganddrop>
    <elementfordraganddrop>textsection</elementfordraganddrop>
    <elementfordraganddrop>media</elementfordraganddrop>
    <elementfordraganddrop>heading</elementfordraganddrop>
    <elementfordraganddrop>bookmark</elementfordraganddrop>
    <elementfordraganddrop>table</elementfordraganddrop>
    <elementfordraganddrop>bookmarkTOC</elementfordraganddrop>
    <elementfordraganddrop>bookmarkjump</elementfordraganddrop>
</elementsfordraganddrop>
```

During HTML processing a custom HTML attribute draggable="true" is appended to elements for which dragging is permitted. Once the HTML representation is presented in the browser, HTML elements adding appropriate event handlers are used to support dragging. Such elements could be ondragstart, onmouseup, or onmousemove to reflect the result of a user operation.

In one implementation, only root elements are draggable. Thus, an entire table, paragraph, heading, etc. can be moved. Although other implementations might allow sub-elements, such as an individual table cell to be moved, such manipulation may conflict with the XML hierarchy. Operating only on root elements avoids this complexity and also make it easier to determine whether particular drag and drops are valid.

In one implementation, instead of embedding placeholders all around the browser window to provide destinations for dragged objects, each element that is draggable also serves as a drop-zone, or a point relative to which another draggable element can be deposited. As a result, each draggable element can be moved before or after any other draggable element. In such an implementation, at least while another object is being dragged, a drop zone is marked by a vertical bar to the left of each drop-zone to show the position of available drop-zones.

Figure 8B:
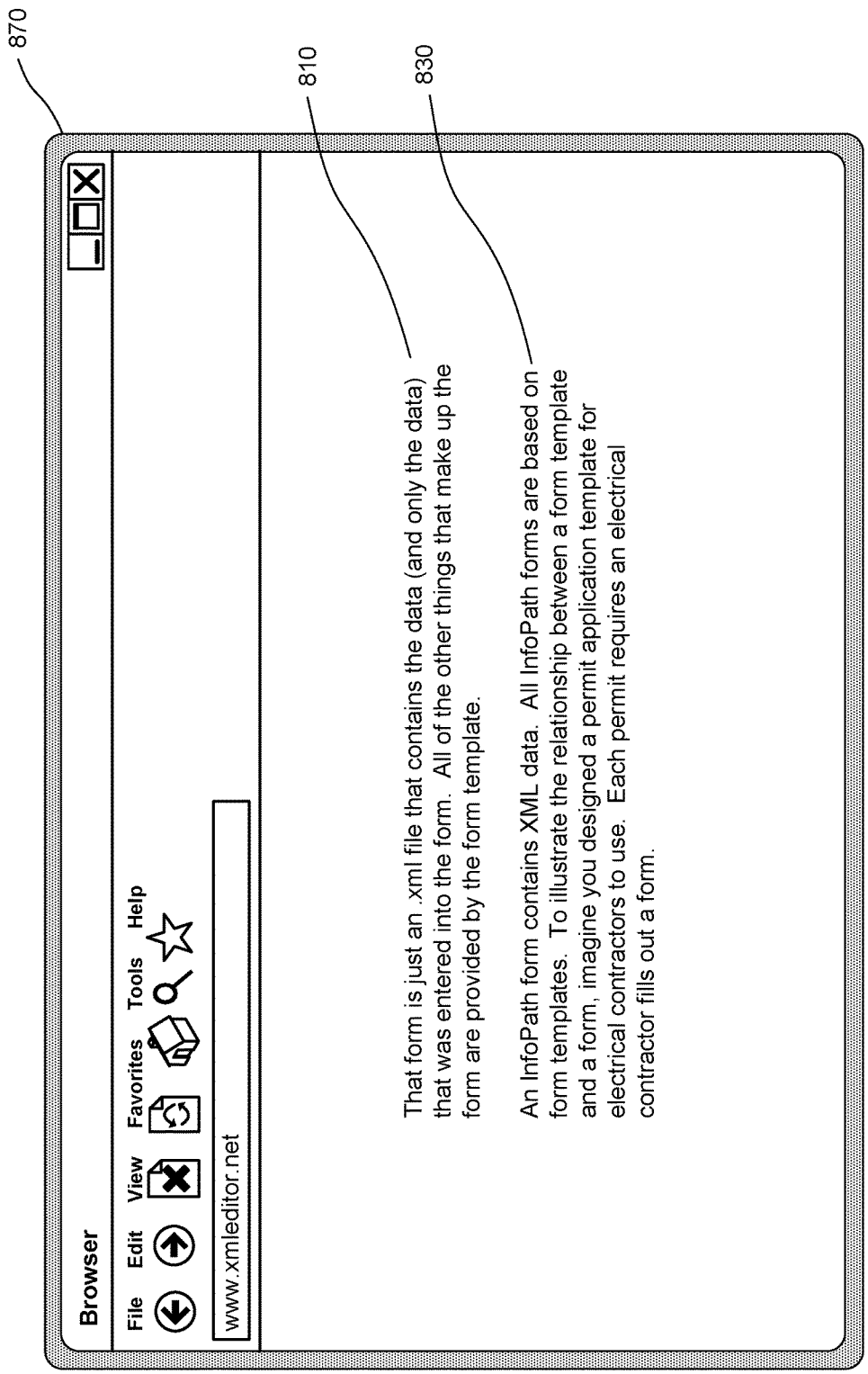

In the example of FIGS. 8A and 8B, in a browser window 800, a second paragraph 810 is dragged from a current position 820 below a first paragraph 830 to a new position 840 above the first paragraph 830. The dragging of the second paragraph 810 across the browser window 800 is represented by a dashed line 850. In FIG. 8A, a vertical bar 860 ahead of the first paragraph 830 indicates a position of an available drop-zone. FIG. 8B shows a browser window 870 after the drag operation, with the second paragraph 810 above the first paragraph 830. After the second paragraph is dropped, ending the drag operation, in the implementation shown, the vertical bar 860 no longer appears, leaving the browser window 870 clear of such drop-zone markers when they are not currently needed.

In the example of FIGS. 8A and 8B, an object is dragged in a browser window 800. Although elements may be dragged and dropped in a rich-text editing interface, also, objects can be dragged in the browser window without invoking another interface. In addition, while the object being dragged in this example includes text, images and any other object can be dragged as long as the configuration file specifies that such objects can be dragged.

Because both the dragged element being moved and the element relative to which the dragged element is being dropped are readily identifiable, an AJAX call can be used to modify the XML on the host. Once the element is moved, a call can be made to delete deletes the element that was moved, and then another call is made to re-insert the dragged element before the element ahead of which it was moved, using the second element as a reference pointer.

Figure 9A:
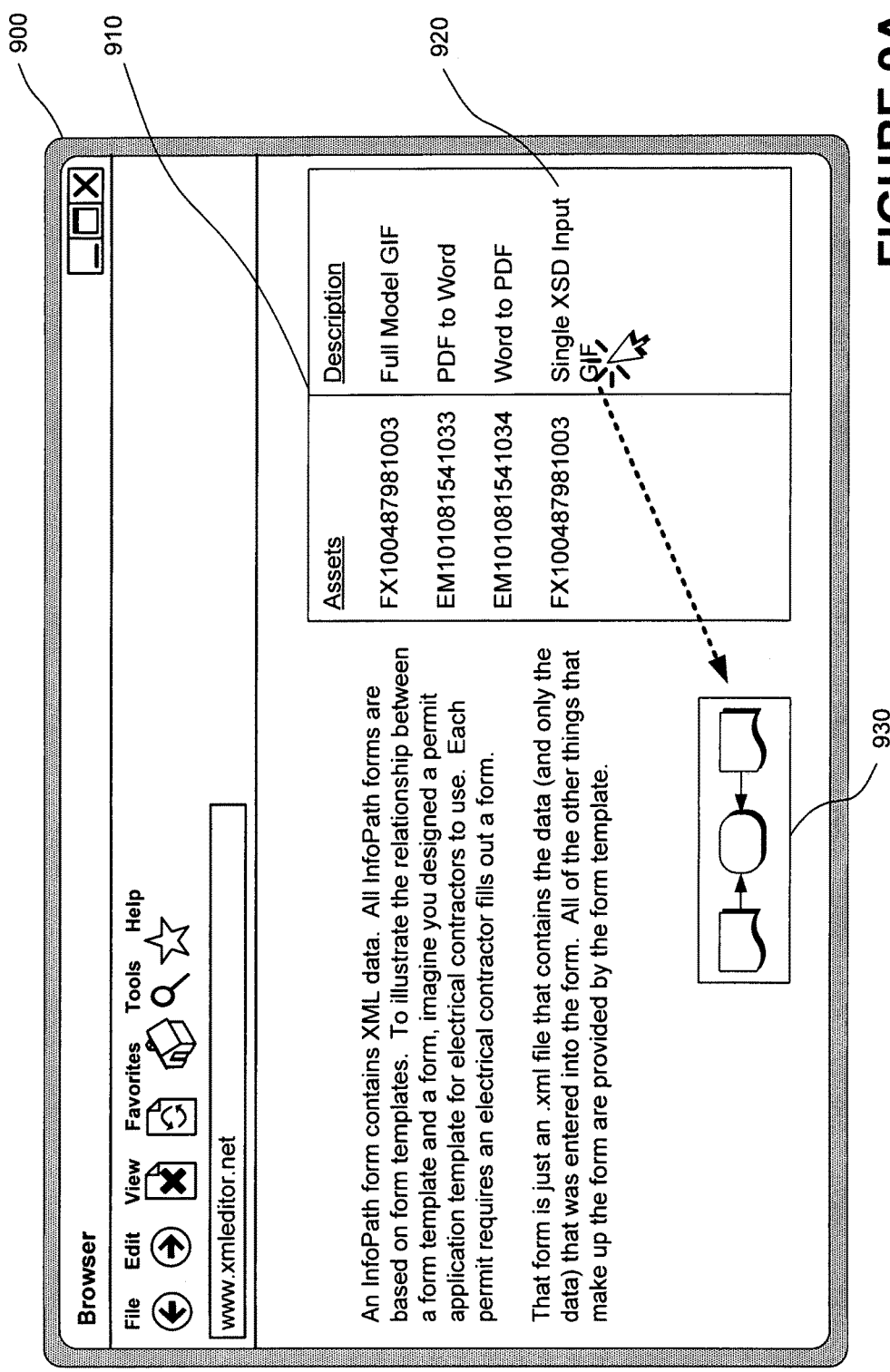

In addition to dragging and moving elements, another drag mode is drag and replace. In a drag and replace, an object is dragged on top of another object, and the contents of the dragged element replace the element on which the dragged element was dropped. FIG. 9A shows a browser window 900 that also includes a search pane 910. A search pane 910, which is further described below, allows for a number of found assets 920 to be made available for insertion and editing. Once the search pane 910 is populated with found assets, a user can drag objects from the search pane 910 to other locations in the browser window 900.

Figure 9B:
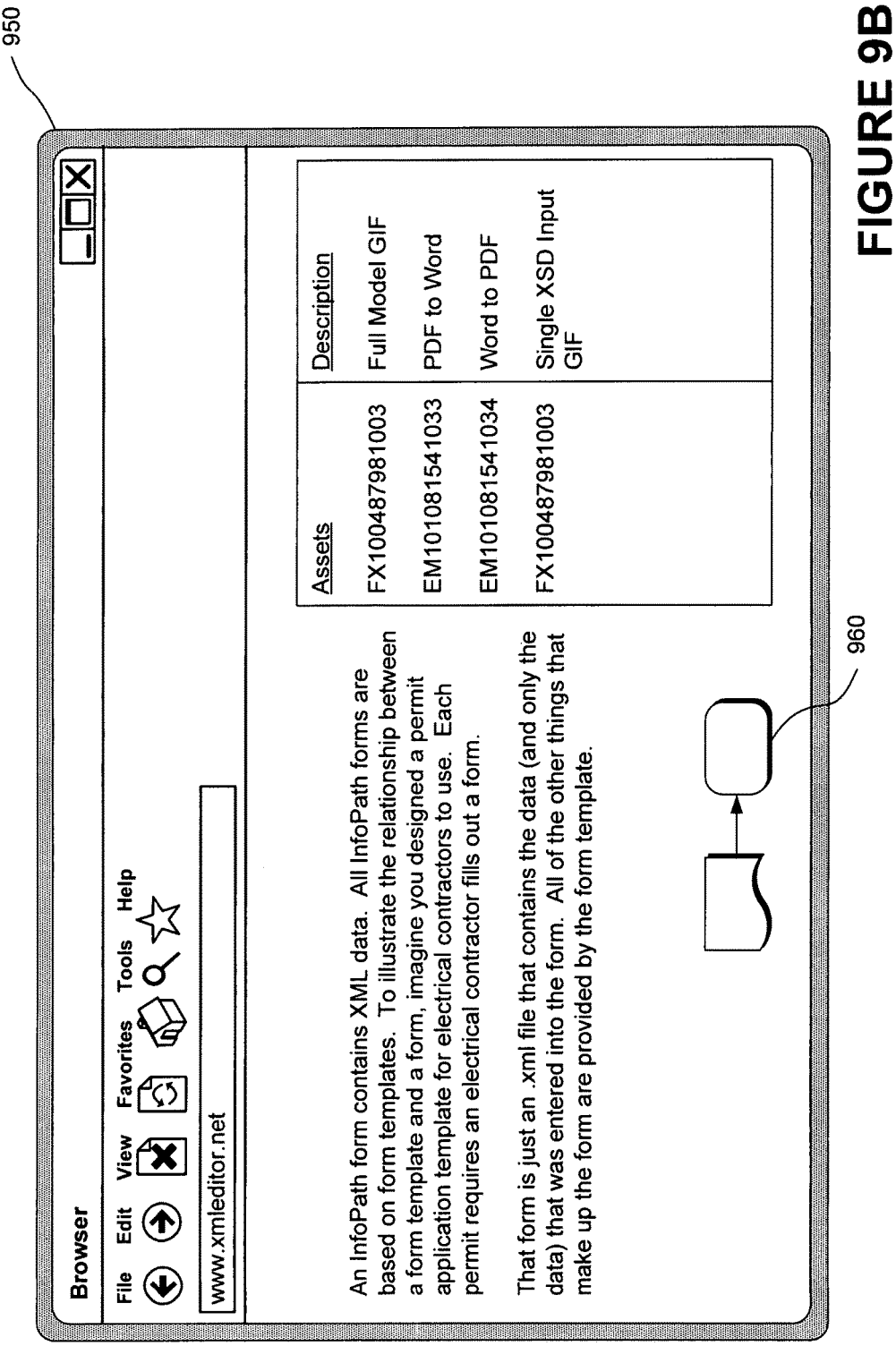

In FIG. 9A, an asset 920 is dragged to a position over an existing object 930. As shown in FIG. 9B, a browser window 950 shows a new object 960 at a location where the existing object 930 was positioned. The new object 960 appears in the browser window 950 instead of the existing object 960 that the new object 960 replaced.

Elements that support being replaced are defined in the configuration file, just as elements that can be dragged are defined, to allow appropriate event handlers to be added to facilitate the dragging. In one implementation, only like elements can be dropped on top—and thus replace—another element.

Other implementations include a drag and insert mode. A drag and insert mode operates comparably to other drag modes, except that a new object is introduced in the document and no objects are deleted from the document.

Side Pane and Search

In implementations of a browser-based, WYSIWYG XML editor, one or more side panes may be used to present additional features. As described with reference to FIGS. 9A and 9B, a search pane may be used to find and maintain a list of assets. To implement such a pane, an AJAX Control toolkit AlwaysVisibleControlExtender is used to keep a menu docked on the right side. When the user clicks the menu, an AJAX AnimationExtender is trigged to expand it size from right to left displaying a search menu.

In one implementation, a search menu has two modes: a basic mode and an advanced mode. In the basic mode users can search across all Office Online assets (non-media) via an MSSearch Query provided by Microsoft Corporation of Redmond, Wash. In the advanced search users have the ability to refine their search criteria by selecting asset types, such as homepage art, clip art, etc., an application filter, number of results, etc. The results are retrieved via a custom class by reading from MSSearch and SQL but can easily be modified to return data from SharePoint or any other data source. The results are returned to the browser in the form of JavaScript Object Notation (JSON). JavaScript functions can parse the JSON objects and generate the appropriate search results depending on the type of results returned. ListView, Images, Templates, and other assets result in a different view in the results and employ different event handlers for drag and drop.

Clipboard Interaction

A client-side AJAX class is used to handle work related to working with the clipboard. When a user copies an element to the clipboard, the element is physically saved to the windows clipboard. A custom class for clipboard access that contains several properties, such as a parent element, an element name, an actual copy of the element, etc. Methods within the class will allow for saving to the clipboard by serializing the class using JSON and saving it to the clipboard. In the same respect, when reading from the clipboard the JSON object is de-serialized back into the clipboard class, allowing its properties to be read. This method potentially allow use of the clipboard in other applications.

Spelling and Grammar Checking

Spelling and grammar checking within an embodiment of the XML editor may be implemented by instantiating a Microsoft Word application as an ActiveX control. An AJAX JavaScript class may be used to provide simple access to the Word API for outsourcing the spelling and grammar checking.

It should be noted that the Microsoft Word application is not marked safe for scripting. As a result, default security settings block users from instantiating this Microsoft Word as an object unless users both add the hosting server as a trusted server, and enable controls that are marked as not safe for scripting.

Microsoft SharePoint Integration

One implementation of the a browser-based, WYSIWYG XML editor runs as a standalone AJAX-enabled, ASP.NET application on top of Microsoft Internet Information Service. Modifications could be made to host it inside of Microsoft SharePoint to also facilitate hosting an implementation of the XML editor. Currently, an implementation of the XML editor is partially integrated with Microsoft SharePoint by making external calls to and from a Microsoft SharePoint server. XML documents, such as help articles, homepages, etc., can be stored in a SharePoint list. Via an option in SharePoint to edit the document, a facility is executed to saves a copy of the selected XML file to the XML editor. A the browser redirects (or opens a new window) to our application passing in some IDs in the query string.

Once all the changes have been made to the XML document, a save function, such as implemented by inserting a Save button at the top of the page, takes the updated XML document and saves it back to the SharePoint list. From the user's perspective the experience is totally integrated except that the application is running on a different server.

User Sessions

This application was designed to allow multiple users to work in their own session environment. A user can only edit one document for a given package at a time since the settings are cached per user and document. When the user edits an XML document a special folder with their alias is created (under a user folder) and all the working files are added to it. A user can return at any time and continue working on the same session w/o losing any work. Once the work is done and they save the file, their session files are removed.

Access to HTML Objects

In one implementation, all HTML objects that the application interacts with are defined by a custom AJAX JS class named OECM.UI. So rather than duplicating HTML IDs throughout the JavaScript code that could possibly change the class references the ID once and all other code references the class. In addition this same class is responsible for displaying and hiding objects such as modal dialogs via custom methods. This unified control has really simplified the code making it much easier to read.

The above specification, examples and data provide a complete description of the manufacture and use of the composition of the invention. Because many embodiments of the invention can be made without departing from the spirit and scope of the invention, the invention resides in the claims hereinafter appended.

We claim:

1. A computer-implemented method, comprising:
    using a browser executing on a local computing system to access and display a hypertext markup language (HTML) representation of an extensible markup language (XML) file, the HTML representation including:
        a plurality of elements of the XML file formatted in accordance with an extensible stylesheet language (XSL) transform associated with the XML file, wherein at least one of the plurality of elements is empty; and
        a plurality of editing handlers inserted within the HTML representation to facilitate modifying the HTML representation and applying the changes to the XML file;
    receiving a selection of a first element of the HTML representation that is displayed;
    in response to the selection of the first element of the HTML representation, evaluating XML attributes of a first XML element that is represented by the first element of the HTML representation;
    dynamically generating a dialog including fields that represent the XML attributes of the first XML element, the fields used to modify the XML attributes of the first XML element in the XML file and displaying the dialog, wherein dynamically generated dialogs change depending on XML attributes of the first XML element as defined in the schema represented by the HTML representation;
    allowing modification of the first element of the HTML representation through the dialog for purposes of applying the modifications to the XML file;
    receiving a selection of a second element of the HTML representation that represents a second XML element that is empty, wherein the empty second XML element is visually represented in the HTML representation such that a user can engage the second XML element;
    displaying an indication to edit the second element of the HTML representation; and
    receiving an edit to the second element of the HTML representation and applying the edit such that the second XML element is no longer empty.

2. The computer-implemented method of claim 1, wherein:
    the XML file is retrieved from a host system; and
    the HTML representation is generated one of:
        on the host system; and
        on the local computing system.

3. The computer-implemented method of claim 2, further comprising upon the modifying the HTML representation:
    manifesting the modification on a display without refreshing a page presented by the browser; and
    communicating the modification to the host using one or more asynchronous calls.

4. The computer-implemented method of claim 1, wherein the plurality of editing handlers inserted within the HTML representation includes one or more of:
    a conditional XSL statement configured to cause the second XML element to be visually represented in the HTML representation whereby the user can engage the second XML element;
    an identifier associated with the first XML element, including:
        an indication of one of a beginning and an end of an XSL template; and
        an XPath query to the first XML element; and
    an HTML event handler associated with an element indicating one or more editing features are available to manipulate the element.

5. The computer-implemented method of claim 4, wherein the one or more editing features include:
    a dialog-based editor configured to one or more of:
        edit text; and
        change attributes of the first XML element;
    a rich-text editor configured to one or more of:
        edit a text-only XML element via a text-editing interface; and
        receive a modification to one or more in-line elements within the text-only XML element;
    a drag and drop editor configured to receive a graphical input including:
        selection of an element; and
        dragging the selected element to one of:
            move the selected element to a new location; and
            replace an existing element at a specified location; and
    a template editor configured to one or more of:
        upon a new XML element being inserted, determining if the new XML element is associated with at least one XML segment; and when the new XML element is associated with at least one XML segment, inserting the at least one XML segment a number of times associated with the new XML element and the at least one XML segment.

6. The computer-implemented method of claim 5, further comprising tracking modifications made to one or more XML elements, including:
adding a change attribute to the modified XML element indicating whether the modified XML element has been one of added or deleted;
causing the change attribute to be visually displayable in the browser and indicate whether the modified XML element has been one of added or deleted.

7. The computer-implemented method of claim 6, further comprising providing an undo option allowing the user to rescind the last change, including:
restoring an object of a most recent change to its prior state by examining modified element and one of:
removing the modified XML element if the modified XML element was added; and
adding the modified XML element if the modified XML element was deleted; and
removing the change attribute from the modified XML element.

8. The computer-implemented method of claim 6, further comprising providing a change reviewing option, including:
allowing a user to navigate to one of a plurality of modified elements; and one of:
accept the modification by removing the change attribute from the modified XML element; and
reject the modification by restoring the modified element to its prior state and removing the change attribute from the modified XML element.

9. The computer-implemented method of claim 1, further comprising validating the modification to the HTML representation, including:
before allowing the user to modify the HTML representation, accessing an XML schema associated with the XML file; and
allowing the modification to the HTML representation if the modification is consistent with attributes included in the XML schema.

10. A computer-readable storage medium, excluding a signal, storing computer-executable instructions configured to:
in response to a command from a client computing system, retrieve an extensible markup language (XML) file;
render the XML file as a hypertext markup language (HTML) representation by applying a series of transforms to the XML file, including:
formatting the XML file in accordance with an extensible stylesheet language (XSL) transform associated with the XML file; and
incorporating a plurality of editing handlers within the HTML representation to facilitate modification of the HTML representation and applying the changes to the XML file;
provide the HTML representation to the client computing system;
receive a selection of a first element of the HTML representation that is a representation of a first XML element including XML attributes;
dynamically generate a dialog comprising fields including fields that represent the XML attributes of the first XML element to modify the first XML element;
displaying the dialog that was dynamically generated;
receiving a selection of a second element of the HTML representation that is a representation of a second XML element, wherein the second XML element is an empty element that is visually represented in the HTML representation such that a user can engage the second XML element;
dynamically generate an indication to edit the second XML element;
receive an edit to the second XML element such that the second XML element is no longer empty;
receive messages from the client computing system indicating a selection to the HTML representation and modifications and edits made to the HTML representation on the client computing system; and
upon receiving notification from the client computing system to change the XML document, apply a series of reverse transforms to the HTML representation to render a modified XML file including modifications applied to the HTML representation of the XML file.

11. The computer-readable storage medium of claim 10, wherein the plurality of editing handlers includes one or more of:
a conditional XSL statement configured to cause the second XML element to be visually represented in the HTML representation whereby the user can engage the second XML element;
an identifier associated with the first XML element, including:
an indication of one of a beginning and an end of an XSL template; and
an XPath query to the first XML element; and
an HTML event handler associated with an element indicating the element is editable using one or more designated editing features available on the client computing system.

12. The computer-readable storage medium of claim 10, further comprising computer-executable instructions to track modifications made to one or more XML elements adding a change attribute to the modified XML element indicating whether the modified XML element has been one of added or deleted.

13. The computer-readable storage medium of claim 12, further comprising computer-executable instructions to support a change reviewing option, including:
receiving a message from the client computing system indicating one of a plurality of modified elements;
when the message indicates the modification has been accepted, removing the change attribute from the modified XML element; and
when the message indicates the modification has been rejected, restoring the modified element to its prior state and removing the change attribute from the modified XML element.

14. A system for editing an XML document, comprising:
a host system including a processor configured to:
store an extensible markup language (XML) document;
apply a series of transforms to convert the XML document into a hypertext markup language (HTML) representation of the XML document, including:
formatting the XML file in accordance with an extensible stylesheet language (XSL) transform associated with the XML file; and inserting a plurality of editing handlers within the HTML representation to facilitate modifying the HTML representation and applying the changes to the XML file; and upon receiving a message that one or more modifications has been applied to the HTML representation, applying a series of reverse transforms to render a modified XML file including modifications applied to the HTML representation of the XML file; and a client system configured to:

receive the HTML representation from the host system;

access and display the HTML representation using a browser;

receive a selection of a first element displayed from the HTML representation;

display a dynamically generated dialog including fields that represent XML attributes of a first XML element represented by the first element of the HTML representation, wherein the dialog is generated in response to the selection of the first element from the HTML representation according to defined attributes of the selected element;

receive one or more modifications to the HTML representation through the dialog;

receive a selection of a second element of the HTML representation, wherein the second element of the HTML representation represents a second XML element and wherein the second XML element is empty, and wherein the empty second XML element is visually represented in the HTML representation such that a user can engage the second XML element;

display an indication to edit the second element of the HTML representation;

receive an edit to the second element of the HTML representation and apply the edit such that the second XML element is no longer empty;

manifest the modifications and edits in the HTML representation; and communicate the modifications to the host system.

15. The system of claim 14, further comprising upon one or more modifications being made to the HTML representation:

manifesting the modification on a display without refreshing a page presented by the browser; and communicating the modification to the host using one or more asynchronous calls.

16. The system of claim 14, wherein the plurality of editing handlers includes one or more of:

a conditional XSL statement configured to cause the second XML element to be visually represented in the HTML representation whereby the user can engage the second XML element;

an identifier associated with the first XML element, including:

an indication of one of a beginning and an end of an XSL template; and an XPath query to the first XML element; and an HTML event handler associated with an element indicating one or more editing features are available on the client computing system to manipulate the element.

17. The system of claim 16, wherein the one or more editing features available on the client computing system include:

a dialog-based editor configured to one or more of:
edit text; and
change attributes of the first XML element;

a rich-text editor configured to one or more of:
edit a text-only XML element via a text-editing interface; and
receive a modification to one or more in-line elements within the text-only XML element;

a drag and drop editor configured to receive a graphical input including:
selection of an element; and
dragging the selected element to one of:
move the selected element to a new location; and
replace an existing element at a specified location; and a template editor configured to one or more of:
upon a new XML element being inserted, determining if the XML element is associated with at least one XML segment; and
when the new XML element is associated with at least one XML segment, inserting the at least one XML segment a number of times associated with the new XML element and the at least one XML segment.

18. The system of claim 14, further comprising tracking modifications made to one or more XML elements, including:

adding a change attribute to the modified XML element indicating whether the modified XML element has been one of added or deleted;

causing the change attribute to be visually displayable in the browser and indicate whether the modified XML element has been one of added or deleted.

19. The system of claim 18, further comprising providing an undo option allowing the user to rescind the last change, including:

restoring an object of a most recent change to its prior state by examining modified element and one of:
removing the modified XML element if the modified XML element was added; and
adding the modified XML element if the modified XML element was deleted; and removing the change attribute from the modified XML element.

20. The system of claim 18, further comprising providing a change reviewing option, including:

allowing a user to navigate to one of a plurality of modified elements; and one of:
accept the modification by removing the change attribute from the modified XML element; and
reject the modification by restoring the modified element to its prior state and removing the change attribute from the modified XML element.

* * * * *